United States Patent
Rao

(10) Patent No.: US 7,871,702 B2
(45) Date of Patent: Jan. 18, 2011

(54) PARTICULATES COMPRISING SILICA AND ALUMINA, AND METHODS OF UTILIZING THESE PARTICULATES IN SUBTERRANEAN APPLICATIONS

(75) Inventor: M. Vikram Rao, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 238 days.

(21) Appl. No.: 10/631,954

(22) Filed: Jul. 30, 2003

(65) Prior Publication Data

US 2005/0022991 A1 Feb. 3, 2005

(51) Int. Cl.
*B32B 5/16* (2006.01)
(52) U.S. Cl. ...................... 428/402; 428/702
(58) Field of Classification Search ................. 428/402, 428/316.6, 702
See application file for complete search history.

(56) References Cited

U.S. PATENT DOCUMENTS

| | | | | |
|---|---|---|---|---|
| 3,891,734 | A | * | 6/1975 | Chauvin ................. 264/43 |
| 3,909,283 | A | * | 9/1975 | Warnke ................. 106/405 |
| 4,018,615 | A | * | 4/1977 | Mills ..................... 501/126 |
| 4,440,866 | A | | 4/1984 | Lunghofer et al. ...... 501/127 |
| 4,493,875 | A | | 1/1985 | Beck et al. .............. 428/403 |
| 4,879,181 | A | | 11/1989 | Fitzgibbon ............. 428/402 |
| 4,921,820 | A | | 5/1990 | Rumpf .................. 501/128 |
| 4,921,821 | A | | 5/1990 | Rumpf et al. .......... 501/128 |
| 5,030,603 | A | | 7/1991 | Rumpf et al. .......... 501/127 |
| 5,120,455 | A | | 6/1992 | Lunghofer ............. 507/269 |
| 5,188,175 | A | | 2/1993 | Sweet ................... 166/280 |
| RE34,371 | E | | 9/1993 | Rumpf et al. .......... 501/128 |
| 5,508,081 | A | * | 4/1996 | Inagaki et al. .......... 428/116 |
| 5,893,416 | A | | 4/1999 | Read ..................... 166/304 |
| 5,941,297 | A | | 8/1999 | Young ................... 164/62 |
| 5,964,291 | A | | 10/1999 | Bourne et al. .......... 166/279 |
| 6,364,018 | B1 | | 4/2002 | Brannon et al. ........ 166/280 |
| 6,372,678 | B1 | | 4/2002 | Youngman et al. ..... 501/128 |
| 6,406,789 | B1 | | 6/2002 | McDaniel et al. ...... 428/402 |
| 6,858,170 | B2 | * | 2/2005 | Van Thillo et al. ..... 264/211.11 |
| 6,913,643 | B2 | * | 7/2005 | Dejaiffe ................. 106/716 |
| 2002/0048676 | A1 | | 4/2002 | McDaniel et al. ...... 428/404 |

FOREIGN PATENT DOCUMENTS

WO    WO 03/042497    10/2002    ............. 43/267

OTHER PUBLICATIONS

Bai et al, "Properties of Lightweight concrete manufactured with fly ash, furnace bottom ash, and lytag", pp. 77-88 (2004).*
Lytag online brochure, "About Lytag" (http://www.lytag.co.uk/pages/AboutLytag.asp).*
Lytag online brochure, "Health & Safety Data Sheet" (http://www.lytag.co.uk/downloads/Healthandsafetysection.pdf).*
http://ewre-www.cv.ic.ac.uk/staff/cheeseman/research.htm, accessed Jul. 17, 2003.
LYTAG granular aggregate specification sheet, May 2001.

* cited by examiner

*Primary Examiner*—H. (Holly) T Le
(74) *Attorney, Agent, or Firm*—Robert A. Kent; McDermott Will & Emery LLP

(57) ABSTRACT

The present invention involves reduced specific gravity particulates and their use in subterranean applications such as production enhancement and completion. One embodiment of the present invention provides particulates comprising silica and an aluminum oxide and at least one void and having a specific gravity of less than about 2.2, a particle size of 8 U.S. Mesh or smaller, and a substantially spherical shape. Other embodiments of the present invention provide for using such particulates in subterranean operations such as fracturing and gravel packing.

19 Claims, No Drawings

PARTICULATES COMPRISING SILICA AND ALUMINA, AND METHODS OF UTILIZING THESE PARTICULATES IN SUBTERRANEAN APPLICATIONS

FIELD OF THE INVENTION

The present invention relates to improved particulates and methods of using such particulates in subterranean applications. More particularly, the present invention relates to reduced specific gravity particulates and their use in subterranean applications such as production enhancement and completion.

DESCRIPTION OF THE PRIOR ART

Servicing fluids comprising particulates are used in a variety of operations and treatments performed in oil and gas wells. Such operations and treatments include, but are not limited to, production stimulation operations such as fracturing and well completion operations such as gravel packing.

An example of a production stimulation operation using a servicing fluid having particles suspended therein is hydraulic fracturing. That is, a type of servicing fluid, referred to in the art as a fracturing fluid, is pumped through a well bore into a subterranean zone to be stimulated at a rate and pressure such that fractures are formed and extended into the subterranean zone. The fracture or fractures may be horizontal or vertical, with the latter usually predominating, and with the tendency toward vertical fractures increasing with the depth of the formation being fractured. The fracturing fluid is generally a gel, emulsion, or foam that may comprise a particulate material often referred to as proppant. The proppant is deposited in the fracture and functions, inter alia, to hold the fracture open while maintaining conductive channels through which such produced fluids can flow upon completion of the fracturing treatment and release of the attendant hydraulic pressure.

An example of a well completion operation using a treating fluid containing particulates is gravel packing. Gravel packing treatments are used, inter alia, to reduce the migration of unconsolidated formation particulates into the wellbore. In gravel packing operations, particles referred to in the art as gravel are carried to a well bore in a subterranean producing zone by a hydrocarbon or water carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel sized to prevent the passage of formation particulates through the pack with produced fluids. The gravel pack screen is generally a filter assembly used to support and retain the gravel placed during the gravel pack operation. A wide range of sizes and screen configurations are available to suit the characteristics of a well bore, the production fluid, and any particulates in the subterranean formation. When installing the gravel pack, the gravel is carried to the formation in the form of a slurry by mixing the gravel with a viscosified carrier fluid. Once the gravel is placed in the wellbore, the viscosity of the carrier fluid is reduced and it is returned to the surface. Such gravel packs are used to stabilize the formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

Fracturing fluids, gravel packing carrier fluids and frac pack fluids generally must be highly viscous to be able to suspend particulates. To achieve a high viscosity, viscosifiers often are added to such fluids. Such viscosifiers are expensive. Moreover, as a fracture or a gravel pack is created a portion of the liquid contained in the fluid may leak off into the formation and/or may create an undesirable filter cake comprising deposited viscosifier on the walls of the fracture, well bore, or the formation.

Filter cakes are sometimes desirable to aid in preventing drilling and other servicing fluids from being lost in the formation and to prevent solids from entering the porosities of the producing formation. However, just as a filter cake may block the loss of fluids into the formation, the same filter cake may block the production of fluids from the formation. Thus, the presence of a filter cake on a producing zone is generally undesirable when a subterranean formation is returned to production. Moreover, residue of viscosifiers used in subterranean applications often remains on the particulates transported in the viscosified fluid and may reduce the conductivity of packs made from such particulates.

Also, as more wells are being drilled in deep water and in high temperature zones, gravel packing in long open horizontal well bores is becoming more prevalent. Completion operations in these wells generally involve the use of reduced-specific gravity particulates that are resistant to degradation in the presence of hostile conditions such as high temperatures and subterranean treatment chemicals. In order to prevent damage to these producing zones by gravel packing operations, the treating fluid carrying the particles should generally exhibit a relatively low viscosity. Similarly, fracture stimulation treatments carried out in deep, high temperature wells require similar reduced-specific gravity, spherical particles in lower viscosity fluids.

Traditional high-strength particulates used in subterranean applications often exhibit too high of a specific gravity to be suspended in such lower viscosity fluids. While low specific gravity particulates, such as walnut hulls are well known in the art, generally they are not able to withstand significant closure stresses over time at elevated subterranean temperatures. Similarly, a variety of light-weight particles formed of thermoplastic materials including polyolefins, polystyrene divinylbenzene, polyfluorocarbons, polyethers etherketones and polyamide imides are commercially available. However, when these particles are exposed to temperatures above about 150° F., they soften and deform, and are not suitable in all well bores.

SUMMARY OF THE INVENTION

The present invention relates to improved particulates and methods of using such particulates in subterranean applications. More particularly, the present invention relates to reduced specific gravity particulates and their use in subterranean applications such as production enhancement and completion.

One embodiment of the present invention provides particulates comprising silica and an aluminum oxide, at least one void, and have a specific gravity of less than about 2.2, a particle size of 8 U.S. mesh or smaller, and a substantially spherical shape.

Another embodiment of the present invention provides particulates comprising at least about 30% silica, less than about 25% aluminum oxides, and a plurality of internal voids.

Still another embodiment of the present invention provides a method of fracturing a subterranean formation comprising the steps of: providing a first fluid; providing a second fluid comprising particulates wherein the particulates comprise silica and an aluminum oxide, at least one void, and have a specific gravity of less than about 2.2, a particle size of 8 U.S. mesh or smaller, and a substantially spherical shape; placing a first fluid into the subterranean formation at a pressure sufficient to create or enhance at least one fracture therein; placing a second fluid into the subterranean formation and fracture; reducing the viscosity of the first fluid; reducing the viscosity of the second fluid so as to deposit the particulates into the fracture; substantially removing the first fluid and second fluid from the fracture while leaving at least a portion of the particulates in the fracture. The first fluid may be the same as or different than the second fluid.

Other and further objects, features and advantages of the present invention will be readily apparent to those skilled in the art upon a reading of the description of preferred embodiments which follows.

DESCRIPTION OF PREFERRED EMBODIMENTS

The present invention relates to improved particulates and methods of using such particulates in subterranean applications. More particularly, the present invention relates to reduced specific gravity particulates and their use in subterranean applications such as production enhancement and completion.

The reduced-specific gravity particulates of the present invention comprise combustion products of carbonaceous materials such as oil, wood, garbage, sewage, hydrocarbons, coal, and the like. Typically, such combustion products suitable for use in the present invention comprise from about 30 to about 70 percent by weight silica and from about 5 to about 25 percent by weight aluminum oxides, with the majority of the balance being oxides of calcium, magnesium, potassium, sodium, iron, and titanium. Generally, the combustion products also comprise materials that will form gas when exposed to sintering temperatures.

In some embodiments of the present invention, the combustion products may comprise "fly ash." Fly ash, as referred to herein, refers to a finely divided residue resulting from the combustion of carbonaceous material, such as ground or powdered coal, and generally carried by generated flue gases. One preferred fly ash is ASTM class F fly ash, having a Blaine fineness of about 10,585 square centimeters per gram and commercially available from Halliburton Energy Services, Inc., of Houston, Tex., under the trade designation "POZ-MIX®." In other embodiments of the present invention, the combustion product may comprise "bottom ash." Bottom ash, as referred to herein, refers to a finely divided residue resulting from the combustion of carbonaceous material and generally accumulating on the floor of an incinerator.

The particulates of the present invention have low specific gravities, preferably below about 2.2. To create particulates having a suitably low specific gravity, it is desirable to control the respective percentages of metal oxides in the final particulate. For example, Table 1 below shows the pure compound specific gravities for a variety of common oxides:

TABLE 1

| Specific Gravity of Metal Oxides | |
|---|---|
| $Fe_2O_3$ | 5.2 |
| $TiO_2$ | 4.2 |
| $Al_2O_3$ | 4.0 |
| $MgO$ | 3.6 |
| $CaO$ | 3.3 |
| $Al_2O_3.SiO_2$ | 3.2 |
| $CaO.Al_2O_3$ | 3.0 |
| $CaO.Al_2O_3.2SiO_2$ | 2.8 |
| $CaO.SiO_2$ | 2.5 |
| $SiO_2$ | 2.3 |

As shown in Table 1, aluminum oxides, such as $Al_2O_3$, are relatively heavy and, as such, the relative degree that these are present in the particulates of the present invention should be considered in light of the desired specific gravity of the particulates. The prior art, however, teaches that aluminum oxides are necessary to impart sufficient crush-resistance to a particulate so that it is useful in subterranean applications. Nevertheless, it has been determined that suitable crush-resistance may be obtained even while the concentration of aluminum oxides in the particulates is greatly reduced. In fact, in some embodiments of the present invention, the percentage by weight of aluminum oxides can be reduced to about 25%, about 10%, or even to zero and yet still produce a product with a crush strength suitable for use in most subterranean applications. By way of example, in one embodiment of the present invention, a particulate may comprise about 60% silica, about 20% alumina oxides, and about 5% calcium oxides.

The particulates of the present invention generally exhibit crush strengths such that they can withstand pressures of at least about 1,000 psi without undesirable performance. One way to determine particulate crush strength is the place a known weight of particulates into a cylinder, apply a known pressure to the cylinder over a one minute time period, hold the pressure for two minutes, and then, once the pressure is released, to determine the weight of the fines produced by the pressure. If the weight of the fines is less than about 20% of the total weight of particulates placed in the cylinder than the particulates can be said to have withstood the pressure applied.

In some preferred embodiments of the present invention, the particulates are capable of withstanding a pressure of at least about 2,500 psi. By way of example, a particulate comprising about 53% by weight $SiO_2$ and about 26% by weight $Al_2O_3$ has been shown to withstand pressures of about 5,000 psi without substantially degrading.

The particulates of the present invention may be made by a process comprising pelletizing and sintering the compositions of the present invention. One embodiment comprises forming a composition comprising combustion products and a binder; pelletizing the mixture into discrete particulates; and sintering the discrete particulates at temperatures above about 1000° C. to produce reduced-density particulates.

Optionally, the discrete particulates may be dried or roasted at temperature between about 65° C. to about 150° C. prior to sintering the particulates. Such drying acts, inter alia, to reduce the particulate's water content.

Binders used in sintering, such as clay, are well known in the art and it is within the ability of one skilled in the art to choose a binder for use in the sintering step of the methods of the present invention. Also known in the art is the fact that a fluid, such as water, is commonly used with the binder in a pelletizing process.

By way of example, in some embodiments of the present invention, the combustion products comprise from about 50% to about 80% by weight of the mixture to be pelletized and the binder comprises from about 0.1% to about 5% by weight of the mixture to be pelletized. Where a fluid such as water is used along with the binder in a pelletizing process, the fluid may comprise from about 10% to about 25% by weight of the mixture to be pelletized.

When such combustion products are pelletized and sintered, they produce particulates that are substantially spherical and that exhibit specific gravities of below about 2.2. The term "spherical" is used in this invention will designate pellets having an average ratio of minimum diameter to maximum diameter of about 0.7 or greater. The size of the particulates of the present invention is generally about 8 U.S. mesh or smaller. Having such a particle size allows the particulates to be useful in sand control operations such as gravel packing and production enhancing operations such as fracturing. One skilled in the art with the benefit of this disclosure will recognize the appropriate size for a given application.

Processes capable of producing spherical pellets are well known in the art. One such method that may be used to produce the particulates of the present invention involves placing combustion products, binder, and a fluid such as water into a high intensity mixer. One such suitable high intensity mixer is the RV02 High Intensity Mixer available from Eirich Machines, Inc. of Gurnee, Ill. As the mixture exits the high intensity mixer, it may then be poured onto a slanted, rotating table. The size of the particulate may be influenced, inter alia, by affecting the speed of the table's rotation and the angle of the table's slant.

The specific gravity and crush strength of the particulates of the present invention may be influenced, in part, by adjusting, inter alia, the percentage of materials in the combustion products that will form gas when sintered; the residence time; the rate of heating in the sintering process; and, the final sintering temperature. For example, as the percentage of materials in the combustion products that will form gas when heated increases, the porosity of the sintered particulate will increase, thus decreasing the particulate's specific gravity and crush-resistance. Moreover, as the residence time in the sintering process and the final sintering temperature increase, the specific gravity of the particulate may increase as porosities within the particulate decrease.

As the percentage of voids in the particulate increases, its specific gravity will decrease and its crush strength will decrease. By controlling the level of voids in the particulate it is possible to tailor a proppant for the specific gravity and crush strength needed in a particular application. When the particulate is sintered, the materials in the combustion products that will form gas when heated leave behind voids and pore spaces in the particulate. Thus, it follows that the level of materials in the combustion products that will form gas when sintered in the pelletized particulate prior to sintering is related to the final level of porosity of the particulate. Thus, as the rate of heating in the sintering process increases, the specific gravity of the particulate may decrease as more porosities are created by the rapid formation of gas in the particulate.

The particulates of the present invention may be heated by any means known in the art. The heating may be batch or continuous. In one continuous heating method, a rotary kiln may be used. A rotary kiln may be a refractory lined cylinder that is fired either directly of indirectly. In a directly fired rotary kiln, heat is provided at one end of the rotating cylinder and the feed of particulates to be heated is provided at the opposite end. Manipulatable kiln parameters include the revolution rate of the cylinder, the tilt angle of the cylinder, the final kiln temperature, and the temperature gradient along the cylinder. One skilled in the art with the benefit of this disclosure will be able to determine the kiln parameters needed to produce a desired particulate.

If a higher porosity particulate is desired, the particulate may be flash-roasted prior to sintering. Flash roasting acts, inter alia, to rapidly drive gases and residual water from the pelletized particulate and to create fissures within the particulate. Flash roasting herein refers to rapidly heating the particulates. If the heating occurs at a high enough rate, the materials that will form gas when heated will quickly exit the particulate. Such a rapid exit yields a porous structure wherein the at least some pores communicate with the exterior. Such pores may be thought of as "intercommunicating pores" because they connect a point inside the particulate with the particulate's surface and the environment surrounding the particulate. Flash roasting may be performed in a standard fluidized bed reactor. Generally, in such a reactor heated gases are fed from below a charge of particulates such that the particulates are lifted and mixed at a high rate while being heated. One flash roaster suitable for use in the present invention is a Torbed® reactor commerically available from Torftech Limited, Ferndale Court, West End Road Mortimer, Reading RG7 3SY, Berkshire, United Kingdom.

Another method of increasing the final level of porosity of the particulate is to include a clay material in the feed mixture of combustion products. Clays inherently contain water molecules that will release when the particulate is flash-roasted or sintered.

Particulates having intercommunicating pores may be used to deliver treatment chemicals to a subterranean formation. A treatment chemical may be introduced into the pores of the particulate and then the particulate may be delivered to the subterranean formation. The treatment chemical may then exit the pores via diffusion. Chemicals suitable for delivery on porous media include but are not limited to gel breakers, oxidizers, enzymes, hydrolyzable esters, scale inhibitors, biocides, corrosion inhibitors, paraffin inhibitors, and substantially any other chemical that is soluble in the formation fluids under the environmental conditions of the formation within which it is placed. The particulates of the present invention may be impregnated with any of the above chemicals by any means known in the art.

In some embodiments of the present invention, at least one of the voids created in the particulate is an internal void. That is, the void is entirely enclosed inside the particulate and does not communicate with the particulate's surface. Where it desirable to minimize intercommunicating pores and create, instead, internal voids, one method of forming such voids is to expose the particulate to higher sintering temperatures for a brief period of time such that the external surface of the particle vitrifies, thus forming a skin on at least a portion of the outer layer of the particulate such that voids communicating with the particulates may be sealed off.

Many subterranean treatments require that particulates be suspended in a treatment fluid and carried into the subterranean formation. Generally, the treatment fluid must exhibit a viscosity high enough to suspend the particulates. The reduced specific gravity of the particulates of the present invention allows for the use of lower viscosity servicing fluids. In one embodiment of the present invention, a treatment fluid comprising a hydrocarbon or water carrier fluid comprising reduced-specific gravity particulates of the present invention suspended therein is pumped into a subterranean formation and at least a portion of the particulates are deposited therein.

One embodiment of a method of the present invention provides an improved method of treating a subterranean formation using a treatment fluid comprising a hydrocarbon or water carrier fluid and reduced-specific gravity particles of the present invention suspended therein. In the treatment methods of the present invention, a treatment fluid comprising a hydrocarbon or water carrier fluid comprising reduced-specific gravity particles of the present invention suspended therein is placed into a subterranean formation and then the carrier fluid's viscosity is reduced so as to deposit at least a portion of the reduced-specific gravity particles in a desired location in the subterranean formation.

Still another method of the present invention provides an improved method of hydraulic fracturing using reduced specific gravity particulates of the present invention. In some hydraulic fracturing methods of present invention, a first fluid is placed in the subterranean formation at a rate and pressure sufficient to form at least one fracture in the subterranean formation. Next, a second fluid comprising particulates of the present invention is placed into the fractures. Next, the viscosity of the first fluid is reduced, inter alia, to facilitate its removal from the subterranean formation and the viscosity of the second fluid is reduced, inter alia, to deposit the suspended particulates in the fracture and, inter alia, to facilitate the removal of the second fluid from the subterranean formation. Finally, the reduced viscosity first fluid and second fluid are substantially removed from the fracture and the subterranean formation.

Another method of the present invention provides an improved method of gravel packing a delivery fluid comprising a hydrocarbon or water carrier fluid comprising reduced-specific gravity particles of the present invention suspended therein. In some of the gravel packing methods of the present invention, a gravel pack composition comprising a carrier fluid having reduced-specific gravity particles of the present invention suspended therein is placed in a region of a well bore such that at least a portion of the gravel particles form a gravel pack substantially adjacent to the well bore. Then the viscosity of the delivery fluid remaining in the well bore may be reduced so that it may then be removed from the subterranean formation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. Particulates comprising silica, an aluminum oxide in an amount of about 0.1 percent to about 25 percent by weight, and at least one void, the particulates having a specific gravity of less than about 2.2, a particle size of 8 U.S. Mesh or smaller, and a substantially spherical shape, wherein the at least one void communicates between a point inside of the particulate, and a surface of the particulate and an environment surrounding the particulate.

2. The particulates of claim 1 comprising from about 30 percent to about 70 percent by weight silica.

3. The particulates of claim 1 further comprising calcium oxides.

4. The particulates of claim 1 wherein the silica and aluminum oxide comprise combustion products of carbonaceous materials.

5. The particulates of claim 1 comprising a particle size of 25 U.S. mesh or smaller.

6. The particulates of claim 1 wherein the particulate is capable of withstanding a closure stress of at least about 2,500 psi.

7. The particulates of claim 1 wherein at least a portion of the outer layer is vitrified.

8. The particulates of claim 1 further comprising a treatment chemical for treating a subterranean formation.

9. The particulates of claim 8 wherein the treatment chemical comprises at least one chemical selected from the group consisting of: a gel breaker, an oxidizer, an enzyme, a hydrolysable ester, a scale inhibitor, a biocide, a corrosion inhibitor, and a paraffin inhibitor.

10. Particulates comprising at least about 30% silica, aluminum oxides in an amount of about 0.1 percent to about 25 percent by weight, a plurality of internal voids, and a substantially spherical shape, wherein at least one of the plurality of internal voids communicates between a point inside of the particulate, and a surface of the particulate and an environment surrounding the particulate.

11. The particulates of claim 10 comprising at least about 40 percent by weight silica.

12. The particulates of claim 10 comprising less than 20% by weight aluminum oxides.

13. The particulates of claim 10 further comprising calcium oxides.

14. The particulates of claim 10 wherein the silica and aluminum oxides comprise combustion products of carbonaceous materials.

15. The particulates of claim 10 comprising a particle size of 25 U.S. mesh or smaller.

16. The particulates of claim 10 wherein the particulate is capable of withstanding a closure stress of at least about 2,500 psi.

17. The particulates of claim 10 wherein at least a portion of the outer layer is vitrified.

18. The particulates of claim 10 further comprising a treatment chemical for treating a subterranean formation.

19. The particulates of claim 18 wherein the treatment chemical comprises at least one chemical selected from the group consisting of: a gel breaker, an oxidizer, an enzyme, a hydrolysable ester, a scale inhibitor, a biocide, a corrosion inhibitor, and a paraffin inhibitor.

* * * * *